(12) United States Patent
Aschauer

(10) Patent No.: US 10,589,928 B2
(45) Date of Patent: Mar. 17, 2020

(54) STORAGE AND RETRIEVAL MACHINE

(71) Applicant: SWISSLOG EVOMATIC GMBH, Sipbachzell (AT)

(72) Inventor: Herbert Aschauer, Wels (AT)

(73) Assignee: Swisslog Evomatic GmbH, Sipbachzell (AT)

( * ) Notice: Subject to any disclaimer, the term of this patent is extended or adjusted under 35 U.S.C. 154(b) by 372 days.

(21) Appl. No.: 15/302,855

(22) PCT Filed: Apr. 8, 2015

(86) PCT No.: PCT/AT2015/050091
§ 371 (c)(1),
(2) Date: Nov. 16, 2016

(87) PCT Pub. No.: WO2015/154116
PCT Pub. Date: Oct. 15, 2015

(65) Prior Publication Data
US 2017/0203918 A1    Jul. 20, 2017

(30) Foreign Application Priority Data

Apr. 8, 2014 (AT) .................................. 264/2014

(51) Int. Cl.
*B65G 1/04* (2006.01)

(52) U.S. Cl.
CPC ......... *B65G 1/0435* (2013.01); *B65G 1/0407* (2013.01)

(58) Field of Classification Search
CPC .................................................. B65G 1/0407
(Continued)

(56) References Cited

U.S. PATENT DOCUMENTS

| 6,199,490 B1 * | 3/2001 | Langer | ................... | B66F 9/141 |
| | | | | 108/143 |
| 2012/0186942 A1 * | 7/2012 | Toebes | ................. | B65G 1/0485 |
| | | | | 198/429 |

FOREIGN PATENT DOCUMENTS

| AT | 505757 T | 4/2011 |
| CH | 523848 A | 6/1972 |

(Continued)

OTHER PUBLICATIONS

European Patent Office; Search Report in International Patent Application No. PCT/AT2015/050091 dated Oct. 14, 2015; 8 pages.
(Continued)

*Primary Examiner* — Saul Rodriguez
*Assistant Examiner* — Willie Berry, Jr.
(74) *Attorney, Agent, or Firm* — Dorton & Willis, LLP

(57) ABSTRACT

A storage and retrieval machine for depositing a load into, or removing a load from, a rack includes a horizontal drive, a vertical drive, and a lifting carriage comprising a load-accommodating unit having a plurality of adjacent, telescopic accommodating fingers that can be individually controlled. Each finger includes a carrier element that is fixed relative to the lifting carriage, a middle finger element, and an end finger element. The middle and end finger elements can be retracted and extended in parallel in both longitudinal axis directions relative to the carrier element. A linear drive element coupled to the middle finger element moves the middle finger element in a direction of its longitudinal axis. At least one coupling element provided on the middle finger element engages the end finger element and converts motion of the middle finger element into an additional motion of the end finger element in the same direction.

14 Claims, 13 Drawing Sheets

(58) Field of Classification Search
USPC .......................................................... 414/282
See application file for complete search history.

(56) References Cited

FOREIGN PATENT DOCUMENTS

| | | |
|---|---|---|
| DE | 1456557 A1 | 2/1969 |
| EP | 0733563 A1 | 9/1996 |
| EP | 1591410 A2 | 11/2005 |
| EP | 1772400 A1 | 4/2007 |
| WO | 2009/150684 A1 | 12/2009 |
| WO | 2010090515 A1 | 8/2010 |

OTHER PUBLICATIONS

Chinese Patent Office; Second Office Action in related Chinese Patent Application No. 201580030635.9 dated Mar. 5, 2019; 3 pages.

* cited by examiner

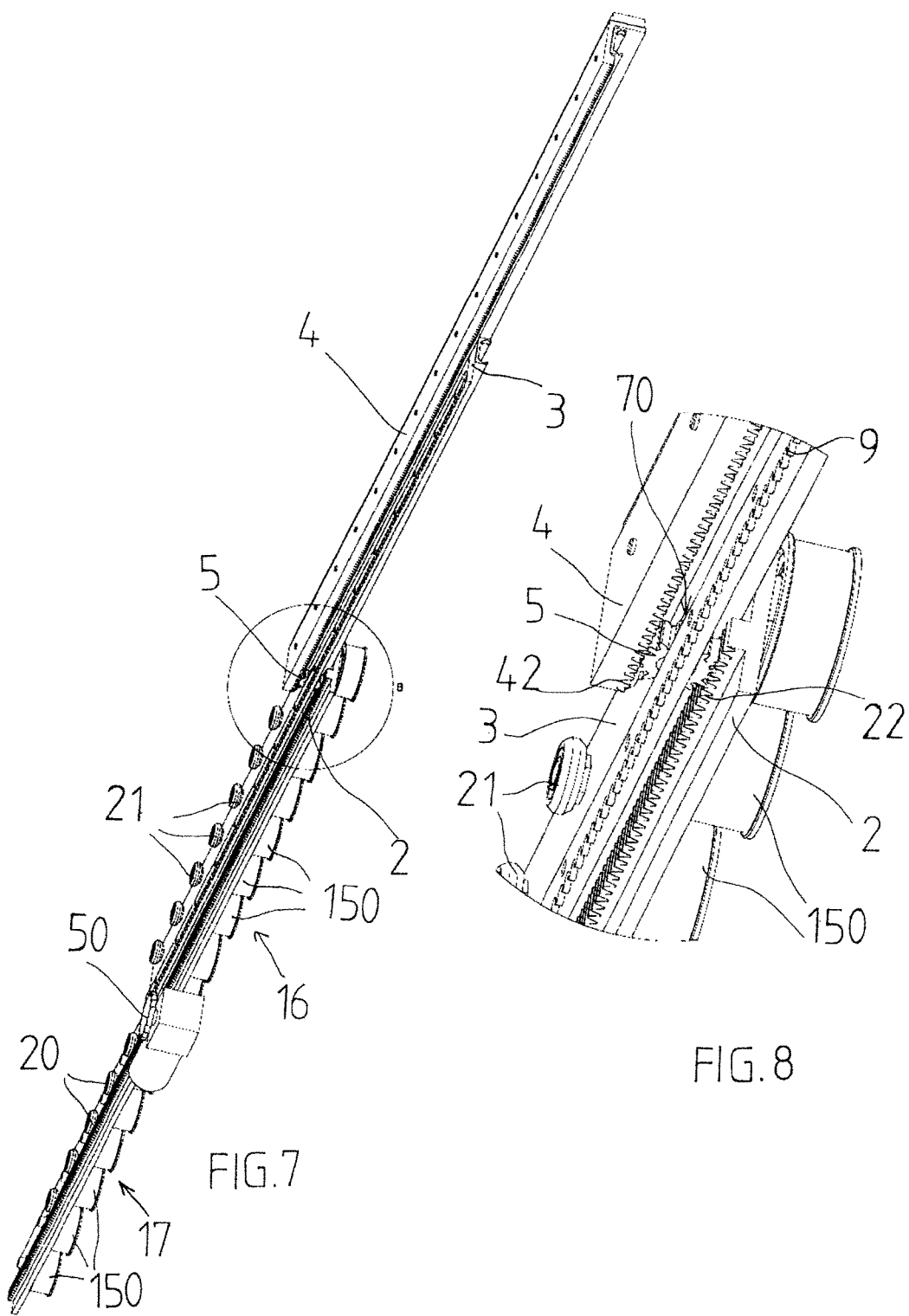

STORAGE AND RETRIEVAL MACHINE

CROSS-REFERENCE TO RELATED APPLICATIONS

This application is a national phase application under 35 U.S.C. § 371 of International Patent Application No. PCT/AT2015/050091, filed Apr. 8, 2015 (pending), which claims the benefit of priority to Austrian Patent Application No. 264/2014, filed Apr. 8, 2014, the disclosures of which are incorporated by reference herein in their entirety.

TECHNICAL FIELD

The invention concerns a storage and retrieval machine for storage and retrieval of a load onto a rack or out of said rack with a horizontal drive, a vertical drive and a lifting carriage comprising a load-accommodating unit with a plurality of telescopic accommodating fingers, which are disposed next to one another and can be controlled individually, and conveying devices, which are allocated to said telescopic accommodating fingers, whereby each telescopic accommodating finger comprises a carrier element, which is fixed relative to the lifting carriage, and a middle finger element and an end finger element, which can be retracted and extended in parallel in both longitudinal axis directions relative to the carrier element.

BACKGROUND

Storage and retrieval machines with a plurality of telescopic accommodating fingers disposed next to one another facilitate the handling of a variety of container shapes, and are used in high-bay warehouses, in particular in automatic small parts warehouses (AKL) with preferred angle or U-profile shelf surfaces in so-called goods distribution centers (known as large warehouses or as "retailers"). Initially delivered, sorted pallets of goods are divided and stored in free areas in the warehouse, and removed again at a later time to assemble defined loading units of different types and quantities.

Due to a large variety of products with relatively low numbers of units per product, the demands, in terms of handling capacity and flexibility with respect to different container shapes, on these consolidation and distribution warehouses are constantly on the rise. To additionally achieve a reduction of storage costs, much attention is also directed to small aisles widths (aisle clearance).

In storage and retrieval machines with telescopic accommodating fingers as they are known to date, however, for stability reasons resulting from the required minimum overlap of the telescopic elements, as is evident from WO 2010/090515 A1, the overall width to be able to safely collect even small containers in rear rack areas cannot be smaller than a specific size, or as suggested by WO 2009/150684 A1 for example, the telescopic accommodating fingers can be constructed only with a relatively large cross section, so that these designs are expensive and unsuitable for certain applications.

Load handling devices with telescopic arms, which lower the load when storing or lift the load when removing it from storage, are generally known in warehouse technology.

Also known in automatic small parts warehouses (AKL) are load handling devices, which pull the load from the storage rack without lifting it. This has the disadvantage, however, that the stored products have to have a uniform, defined geometric shape, or that additional loading aids, such as cases, trays or cartons, are needed.

EP 1 772 400 A1 shows an aforementioned storage and retrieval machine with telescopic arms, which each exhibit a supporting part, a central part and an inner part. When the central portion is displaced by a certain amount, the inner part is additionally further displaced by the same amount with respect to the central part by means of belts with deflection pulleys. The construction of both the central part and the telescopic arm cross section are relatively complex and prone to failure. Only small extension lengths can be achieved with them.

AT 505 757 A4 shows a pallet truck with a telescopic extension, exhibiting a first and a second telescopic part, whereby the first telescopic part is braced by a support roller and exhibits a profile rail in which a linear rolling bearing unit is guided. The first and second telescopic parts are driven via a rack attached to the underside of the first telescopic part, into which a drive pinion of a drive system engages. Due to the short second telescopic part, the maximum extension length is relatively small.

According to EP 1 591 410 A2, an outer part of a telescopic arm is driven via a worm screw that is mounted within the telescopic arm profile, thereby effecting a corresponding cross section enlargement.

SUMMARY

An object of the present disclosure is therefore to provide a storage and retrieval machine that permits a compact design with high stability in the extended position of the telescopic fingers and the smallest possible overall width, so as to be able to realize very small rack spacings (aisle clearances).

A further object of the disclosure is to specify a storage and retrieval machine with a small telescopic finger cross section and a small distance between the telescopic fingers in order to ensure a high level of flexibility in terms of handling a variety of containers and shelf surface shapes.

Another object of the disclosure is the creation of a robust and reliable drive for extending the telescoping fingers that can be constructed in a space-saving manner.

Inventively this is achieved by providing a linear drive element coupled to the middle finger element, via which a movement of the middle finger element in the direction of the longitudinal axis of the middle finger element can be produced, and by providing at least one coupling element on the middle finger element, which is in engagement with the end finger element and which converts the movement of the middle finger element into an additional movement of the end finger element in the same direction.

Based on this guidance of the extendable elements of the telescopic accommodating finger by the interaction of a coupling element disposed on or in the middle finger element and the carrier element engaged in said coupling element and the end finger element a very narrow compact design of the individual telescopic accommodating fingers can be achieved and the drive for pushing out the individual elements in the extension and retraction process can be constructed with very small dimensions.

Due to the compact and low overall height of the telescopic accommodating fingers, and consequently also of the load handling device, the space conditions on the bottom shelf surface in particular can be used in the most efficient way possible.

In contrast to pulling out of or pushing into the storage rack, transport in the course of loading and unloading with the inventive storage and retrieval machine occurs by raising or lowering, and is therefore much more gentle. Even taller containers with a small cross section and a higher center of gravity can therefore be handled easily. The base of the container does not necessarily have to be flat either, and unusually shaped containers, such as bottle packs shrink-wrapped in foil, for example 6-packs, can be moved in and out of storage without difficulty. For smaller articles this makes it possible to do without loading aids, such as cases, trays or cartons.

In accordance with another further development in accordance with the disclosure, the conversion of the movement of the middle finger element into a movement of the end finger element in the same direction can be realized in that there are rack sections on the carrier element and the end finger element, which extend in longitudinal direction and are oriented to lie across from one another, and in that the at least one coupling element is formed by a gear wheel, whereby the middle finger element disposed between the carrier element and the end finger element exhibits an opening, in which the gear wheel that meshably engages in the rack section of the carrier element and in the rack section of the end finger element is rotatably mounted, so that, upon a linear movement of the middle finger element relative to the carrier element caused by the linear drive element, the end finger element executes a linear movement by rolling the gear wheel in the direction of the linear movement of the middle finger element.

The gear wheel mounted on the middle finger element thus engages both the carrier element and the end finger element, by means of which the conversion of the movement of the middle finger element into an additional movement of the end finger element in the same direction is carried out.

As a result of the mutual bracing achieved through the arrangement of the carrier element and the middle finger and end finger elements of each telescopic finger, high stability in the extended position at extremely low overall width of the inventive storage and retrieval machine in the retracted position of the telescopic fingers can be ensured as well.

Due to the gear ratio, the end finger element in a design example of the inventive storage and retrieval machine can exhibit a travel path that is twice as long as that of the middle finger element, which allows the achievement of a nearly 100% utilization of the travel path when moving out of and into storage. The speed of the movement is hereby increased as well.

Since the rack sections of the carrier element and the end finger element are disposed across from one another, in accordance with a preferred embodiment of the invention the axis of rotation of the gear wheel can be perpendicular to the longitudinal axis and lie in the plane of the middle finger element.

The individually controllable telescopic accommodating fingers can be pushed out in both directions transverse to the direction of travel of the inventive storage and retrieval machine, which is why, in accordance with another design of the invention, it has proved to be beneficial to dispose the gear at half the length of the middle finger element to allow the same length of extension in both directions.

Within the context of this disclosure, the structure of the coupling element can be configured in a variety of ways to achieve the function of converting the movement to the end finger element.

According to another embodiment, it can therefore be provided that rack sections are respectively configured on the carrier element and the end finger element, which extend in longitudinal direction and are oriented to lie across from one another, and that the at least one coupling element is formed by three or more paired gear wheels, whereby the middle finger element disposed between the carrier element and the end finger element exhibits an opening in which the gear wheels, of which at least two meshably engage in the rack section of the carrier element and in the rack section of the end finger element, are rotatably mounted, so that, upon a linear movement of the middle finger element relative to the carrier element caused by the linear drive element, the end finger element executes a linear movement by rolling the gear wheel in the direction of the linear movement of the middle finger element.

With the arrangement of three or more paired gear wheels, an even longer extension of the end finger element can be achieved, if the gear wheel engaging into the carrier element and the gear wheel engaging in the end finger element are at a distance from one another and the linear drive element is likewise formed by three paired gear wheels. This slight possibility of elongation can be used, if necessary, to compensate for the existing distance between the rack and the load handling device or storage and retrieval machine to really reach even the rearmost position in the shelf safely.

In order to achieve extension and retraction of the individual telescopic accommodating fingers that is as low-friction as possible, in accordance with another further development of the invention, longitudinally spaced guide rollers can be disposed on one side of the carrier element and the middle finger element, into each of which a guide profile engages that is movable relative to said elements and that is mounted on the side of the middle finger element opposite to the carrier element and on the side of the end finger element opposite the middle finger element.

During the extension and retraction process of the individual telescopic accommodating fingers, the interplay of guide rollers and guide profiles disposed on opposite sides of the telescopic accommodating finger elements allows a smooth-gliding displacement of these elements, which are disposed next to one another in a space-saving manner.

In another embodiment of an inventive storage and retrieval machine in accordance with the disclosure, particularly stable and robust guidance results from the fact that the guide profiles exhibit a C-shaped cross section, and that the guide rollers are configured as truncated cone rollers that abut corresponding inner surfaces of the guide profiles with their truncated cone surfaces. The bowing of the individual telescopic accommodating finger elements under weight load can thus effectively be prevented.

Due to the side by side disposition of the carrier element, the middle finger element and the end finger element, the customary telescoped pipe cross sections, which require relatively large dimensions, can be dispensed with.

In a further aspect of the disclosure, the end finger element can exhibit a profile with a vertically extending leg and an overhead crosspiece, on which a support element is disposed for moving loads and which—seen in cross section—extends in the direction of the carrier element at a distance above the upper edge of the middle finger element. The support element is thus completely decoupled from the movement of the middle finger element and the carrier element, so that the weight load of the support element has a correspondingly low impact on the extension and retraction process.

In a further aspect of an inventive storage and retrieval machine in accordance with the disclosure, the extension of the middle finger element can be realized in that, on its underside, the middle finger element exhibits a rack element that extends in longitudinal direction and is coupled with the linear drive element, via which the middle finger element can be moved relative to the carrier element in two opposite directions.

The above and other objects and advantages in accordance with the principles of the present disclosure shall be made apparent from the accompanying drawings and the description thereof.

BRIEF DESCRIPTION OF THE DRAWINGS

In the following, exemplary embodiments of the invention will be explained in detail using the example depicted in the drawings. The figures show:

FIG. 7 is an oblique view from below of the embodiment shown in FIG. 2;

FIG. 8 is a detail of FIG. 7;

DETAILED DESCRIPTION

Figure 1:
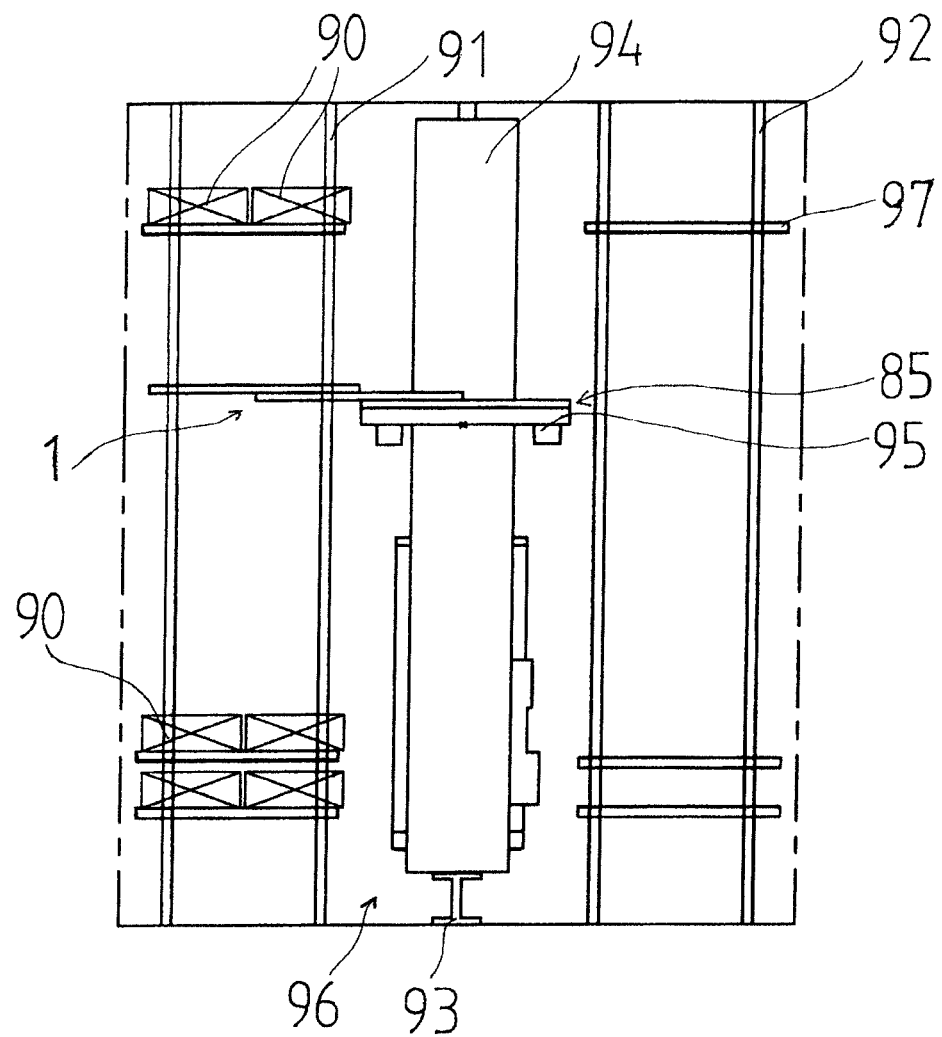
FIG. 1 is a front view of an embodiment of the inventive storage and retrieval machine with racks.

FIG. 1 shows two parallel racks 91, 92, forming between them an aisle 96, in which a storage and retrieval machine with a mast 94 and a lifting carriage 85 can be moved horizontally along a rail 93. The storage and retrieval machine is used for storage and retrieval of a load 90 onto or out of the rack 91 or 92 that is fitted with shelves 97. For this purpose, the lifting carriage 85 can be moved vertically up and down, so that, via a horizontal movement of the storage and retrieval machine and a vertical movement of the lifting carriage 85, for which corresponding drive units are provided on the storage and retrieval machine, every storage location on the shelves 91, 92 can be reached.

The control devices, which are well-known for use on storage and retrieval machines, and allow a fully automated handling of the load 90, are not discussed in more detail, because knowledge of them is assumed.

The lifting carriage 85 exhibits a load handling device 95 with a plurality of individually controllable telescopic accommodating fingers 1, which are disposed next to one another and can be extended or retracted in both directions transverse to the horizontal direction of travel of the storage and retrieval machine, i.e. both in the direction of rack 91 as well as in the direction of rack 92. FIG. 1 shows the telescopic accommodating fingers 1 in their extended position in the direction of rack 91.

The shelves surfaces exhibit U-profiles 86 (FIG. 2), in which the telescopic accommodating fingers 1 can be inserted to store the load 90 on the rack 91 or 92 or retrieve it from said rack.

To accommodate the load without the risk of tipping over, a variable number of telescopic accommodating fingers 1 can be extended depending on the width of the load 90.

Figure 2:
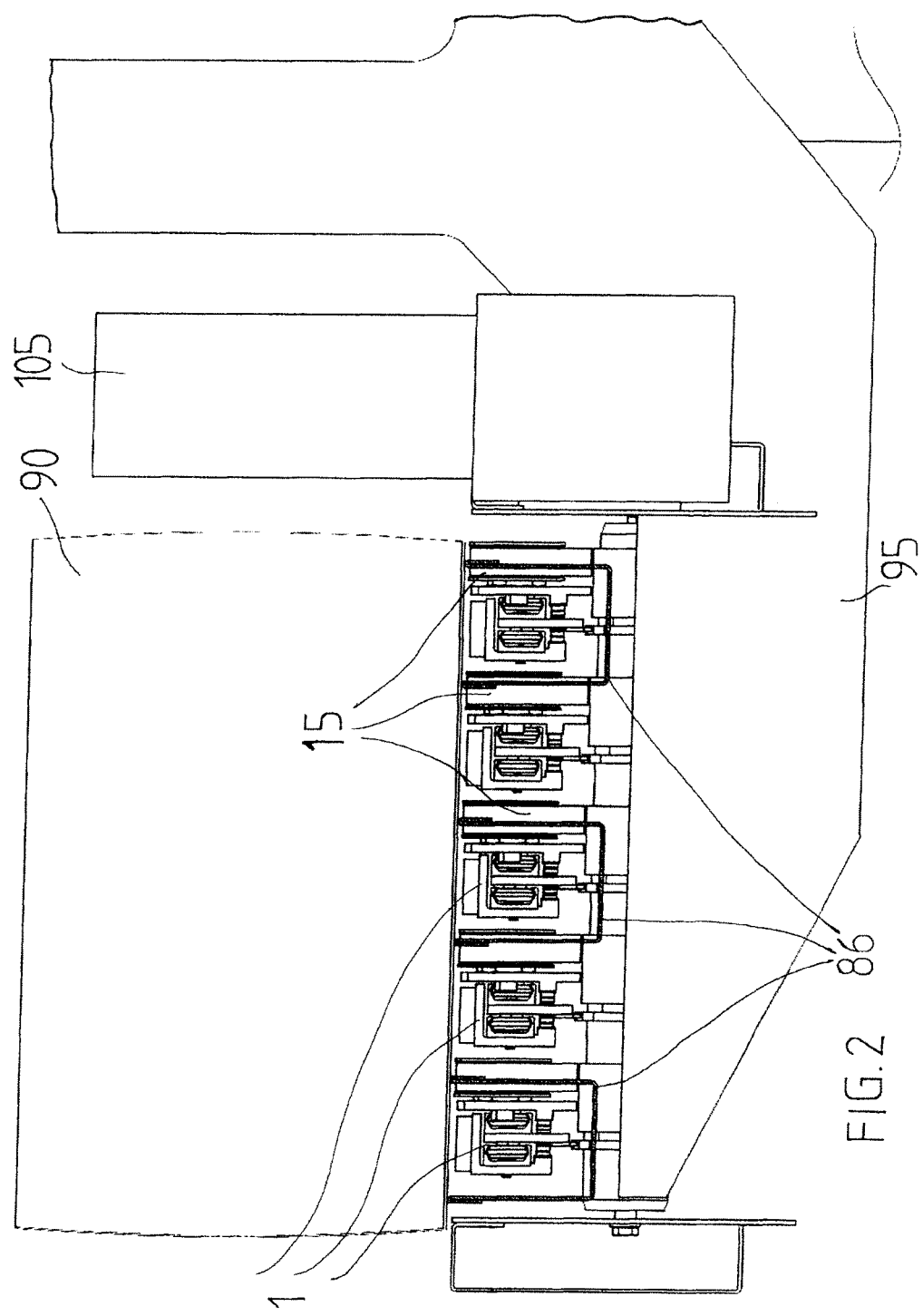
FIG. 2 is a partial end view of another embodiment of the inventive storage and retrieval machine.

FIG. 2 shows the load handling device 95 in the form of two projecting arms to which five telescopic accommodating fingers 1 are attached. In the design example according to FIG. 2, the U-profiles 86 are configured in such a way that every second telescopic accommodating finger 1 can be inserted into them to raise the load 90.

Figure 3:
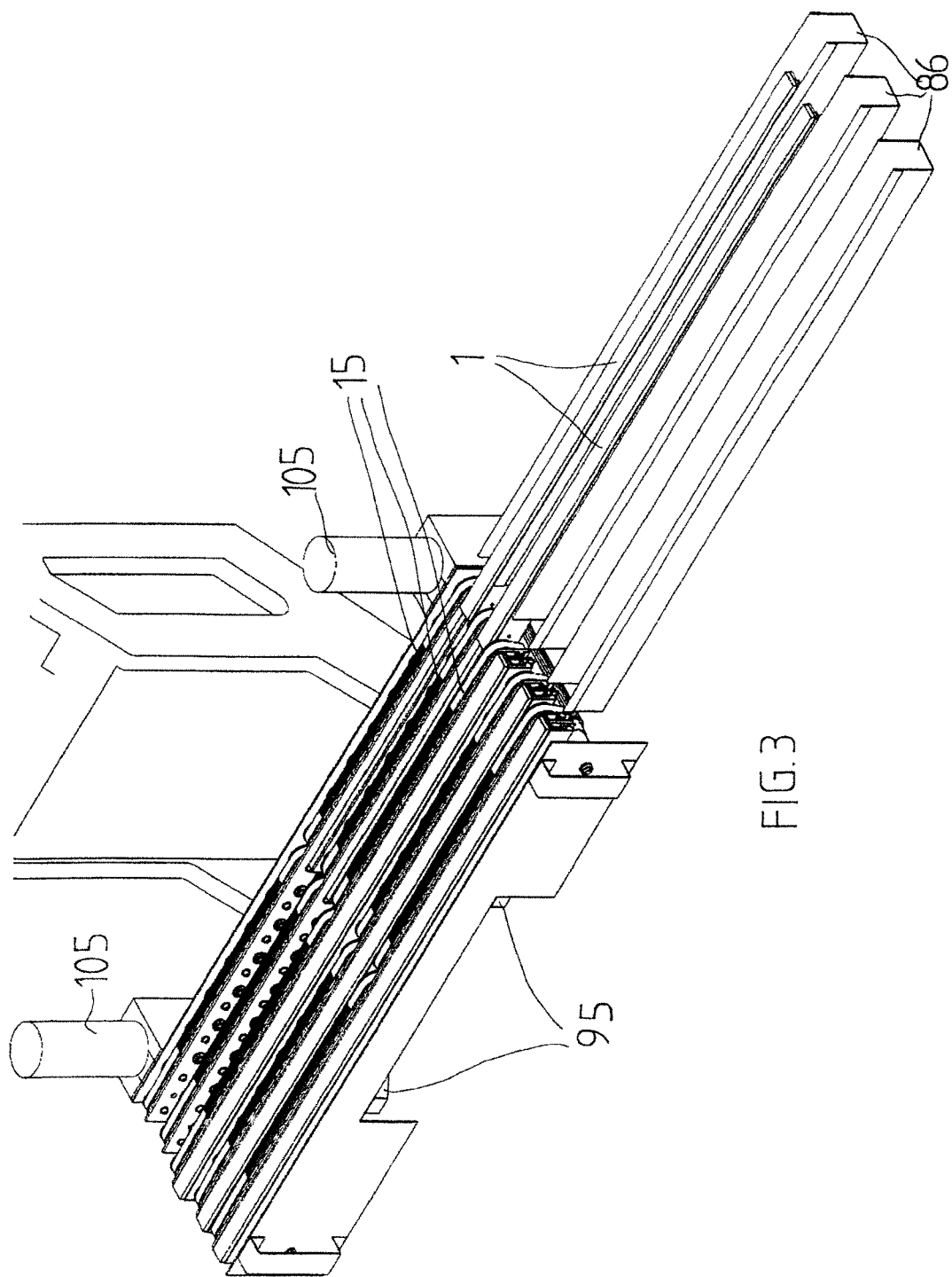
FIG. 3 shows an oblique view of the embodiment according to FIG. 2.

FIG. 3 shows an oblique view of the load handling device 95 with two extended telescopic accommodating fingers 1 of the total number of five telescopic accommodating fingers 1. For improved clarity, the U-profiles 86 are shown without the load 90. FIG. 2 and FIG. 3 also show the conveying devices 15 that are associated with the telescopic fingers 1 and are formed by driven, circulating conveyor belts, with which the load 90 can be moved onto or off the extended telescopic accommodating fingers 1.

Figure 4:
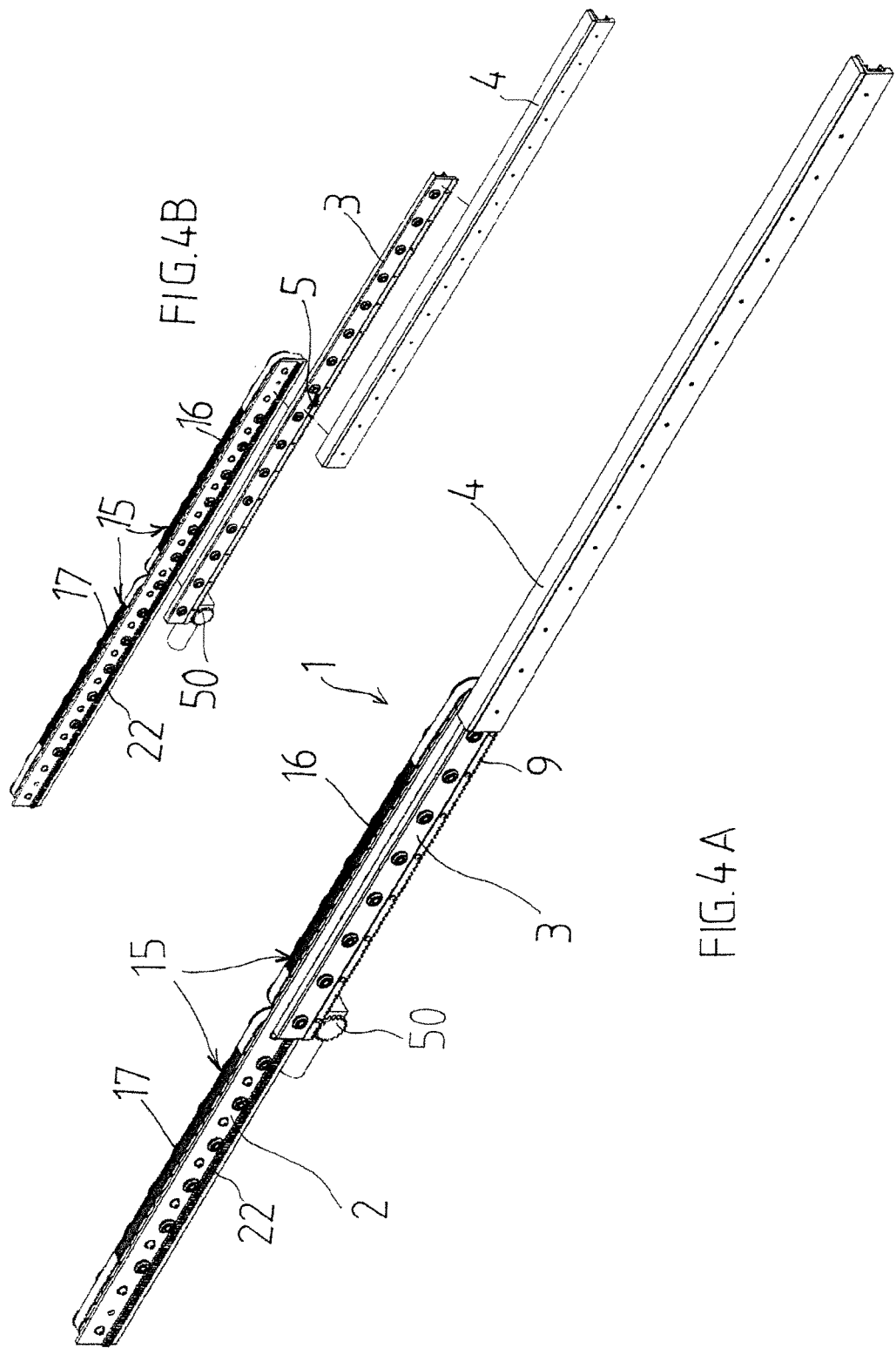
FIGS. 4A, 4B and 5 show an oblique view and a front view of a telescopic accommodating finger of the embodiment of the inventive storage and retrieval machine according to FIG. 2.
Figure 5:
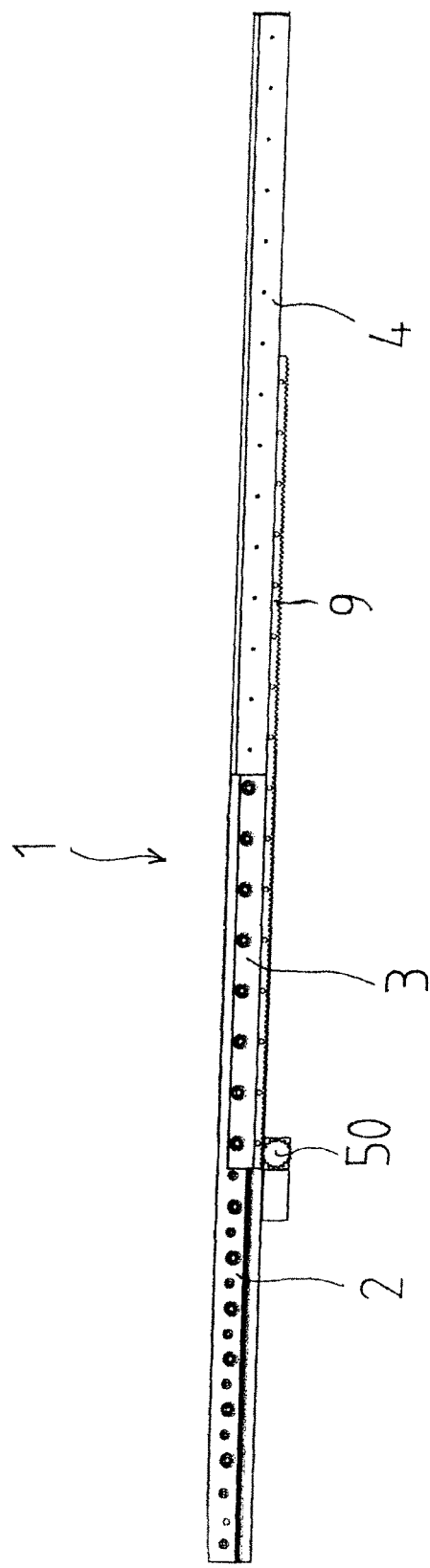

FIGS. 4A, 4B and 5 show one of the telescopic accommodating fingers 1 in the extended position with the associated conveying device 15. The telescopic accommodating finger 1 is composed of a carrier element 2 that, in its installed state, is fixed with respect to the load handling device 95 and/or the lifting carriage 85, and a middle finger element 3 and an end finger element 4 together, which can be retracted and extended in parallel in both longitudinal axis directions relative to the carrier element 2.

Figure 6:
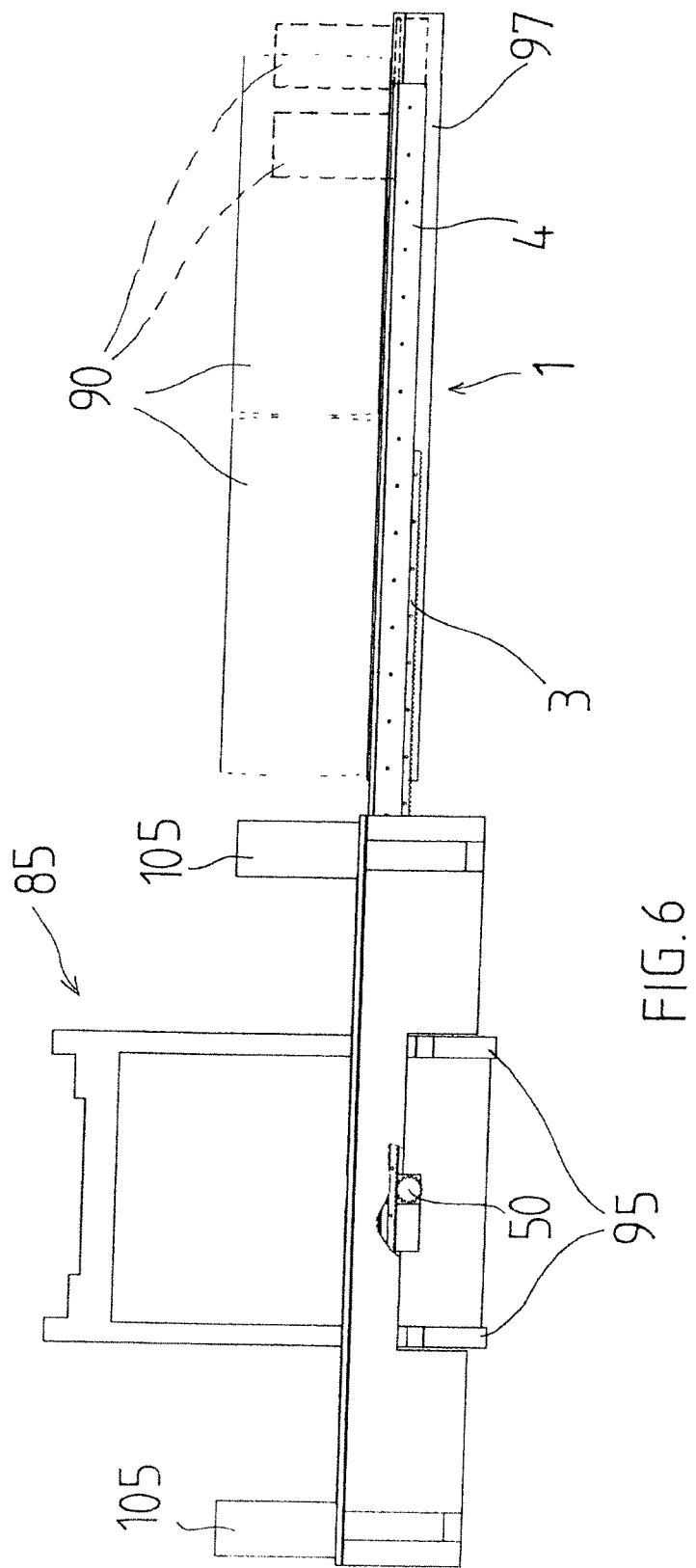
FIG. 6 is a front view of the embodiment shown in FIG. 2 in the installed state.

FIG. 6 shows the installed telescopic accommodating finger 1 with a load 90 consisting of two containers in a position in which it is being lowered in a shelf 97.

A linear drive element 50 coupled to the middle finger element 3 is inventively provided, via which a movement of the middle finger element 3 in the direction of the longitudinal axis of the middle finger element 3 can be produced, on which a coupling element 5 is provided, which is in engagement with the end finger element 4 and which converts the movement of the middle finger element 3 into an additional movement of the end finger element in the same direction.

As shown in detail in FIGS. 7 and 8, rack sections 22, 42 are respectively configured on the carrier element 2 and the end finger element 4, which are oriented to lie across from one another and extend in the direction of the longitudinal axis.

The middle finger element 3 is displaced with respect to the load handling device 95 via the linear drive element 50.

Figure 14:
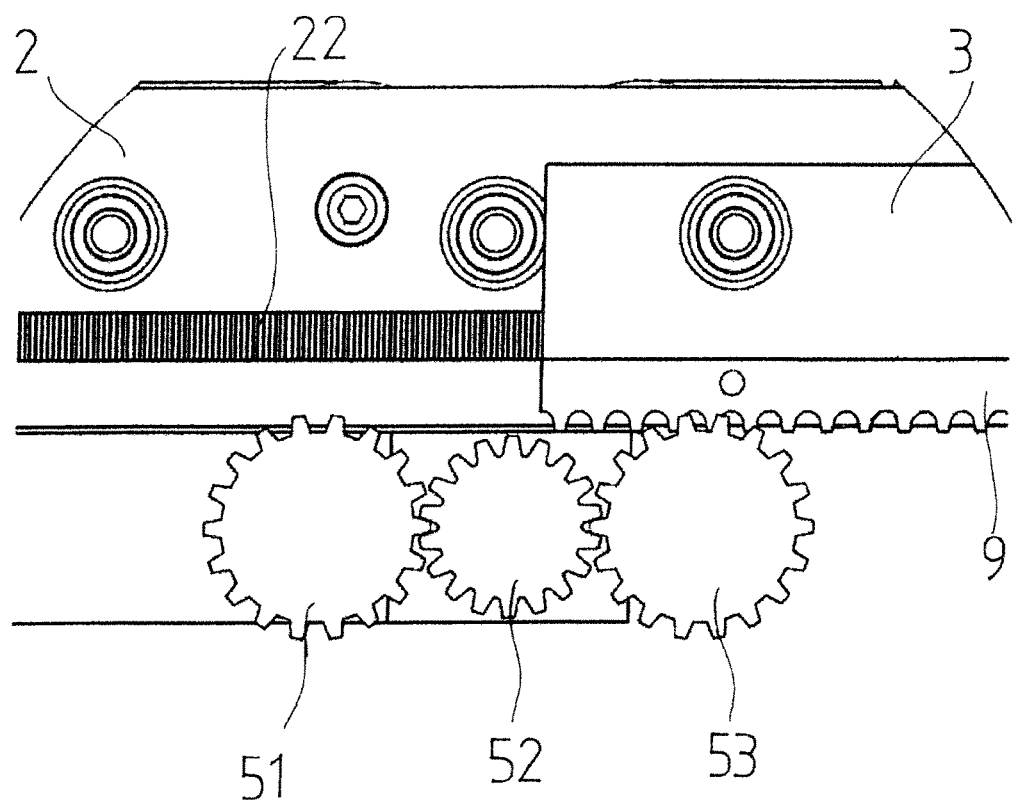

The coupling element in this design example is formed by a gear wheel 5. The coupling element can also, however, as described in more detail below, be formed by three or more gear wheels. This results in an additional extension of the end finger element 4, as indicated by dashed lines in FIG. 6, which allows additional smaller containers 90, which are shown in dashed lines in FIG. 6, to be retrieved from the rearmost area of the shelf. To fulfill its function, the linear drive element 50 must likewise be formed of three or more paired gear wheels (not shown in FIG. 6), as is shown in FIG. 14.

Again referring to FIGS. 7 and 8, the middle finger element 3 disposed between the carrier element 2 and the end finger element 4 exhibits an opening 70, in which the gear wheel 5 that meshably engages in the rack section 22 of the carrier element 2 and in the rack section 42 of the end finger element 4 is rotatably mounted, so that, upon a linear movement of the middle finger element 3 relative to the carrier element 2 caused by the linear drive element 50, the end finger element 4 executes a linear movement by rolling the gear wheel 5 in the direction of the linear movement of the middle finger element 3.

If the middle finger element 3 is thus moved in one or the other direction relative to the carrier element 2 by the linear drive element 50 (FIG. 4A, 4B), the gear wheel 5 that is rotatably mounted in the middle finger element 3 rolls along the rack section 22 of the carrier element 2 on the one side and, in doing so, displaces the end finger element 4 in the same direction via the opposite movement on the other side.

In the depicted design example, the end finger element 4 exhibits a travel path that is twice as long as that of the middle finger element 3.

The axis of rotation 55 (FIG. 9) of the gear wheel 5 is perpendicular to the longitudinal axis and lies in the plane of the middle finger element 3.

The gear wheel 5 is disposed at half the length of the middle finger element 3, as is apparent from FIG. 4B and FIG. 7.

In the depicted design example, the linear drive element 50 is realized by means of a gear wheel driven by a motor; within the context of the invention it can, however, also be designed differently.

Figure 9:
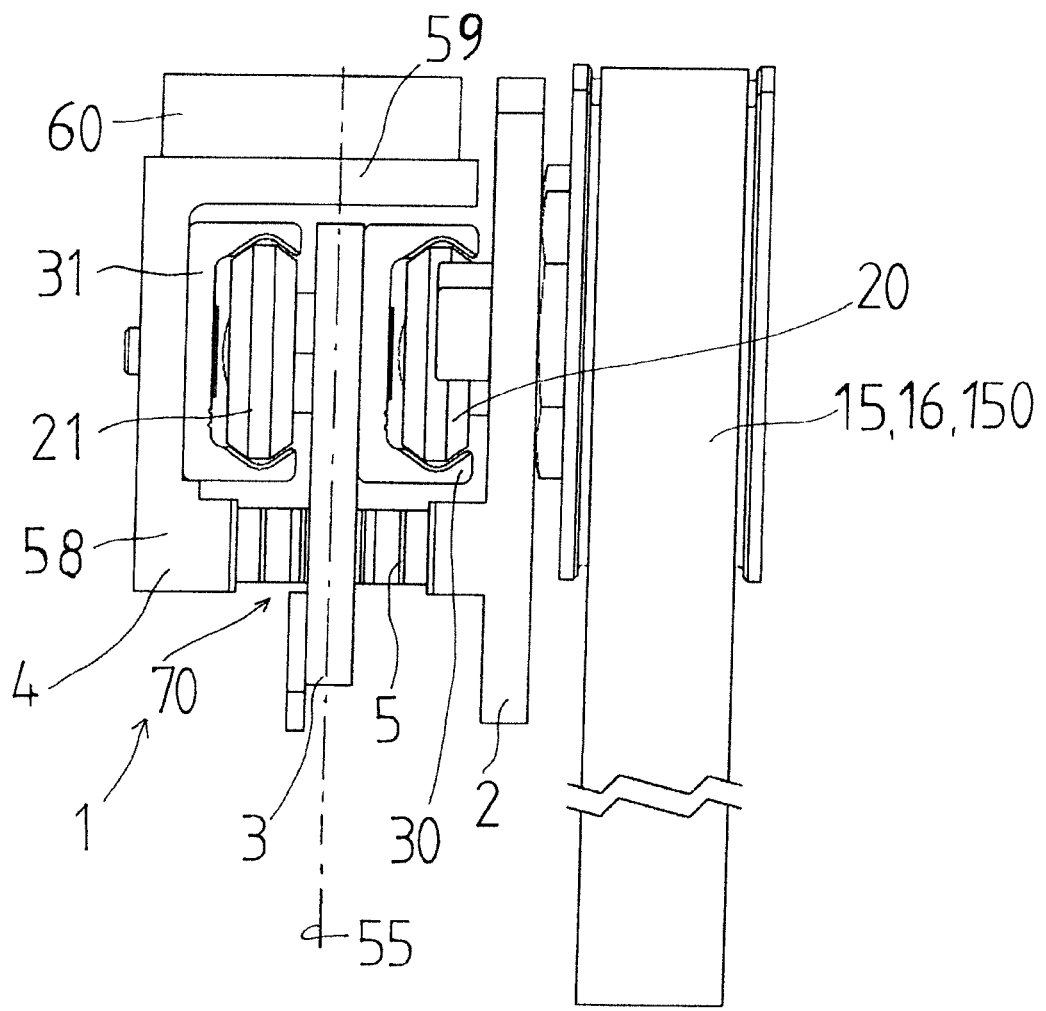
FIG. 9 is a view of the end face of a telescopic accommodating finger of the embodiment of FIG. 2.

As shown in FIG. 9, for the purpose of better movability of the middle finger element 3 and the end finger element 4, longitudinally spaced guide rollers 20, 21 are respectively disposed on one side of the carrier element 2 and the middle finger element 3, into each of which a guide profile 30, 31 engages that is movable relative to said elements.

For their part, the guide profiles 30, 31 are mounted on the side of the middle finger element 3 opposite to the carrier element 2 and on the side of the end finger element 4 opposite the middle finger element 3 and thus enable low-friction gliding on the guide rollers 20, 21 engaged in them.

Figure 10:
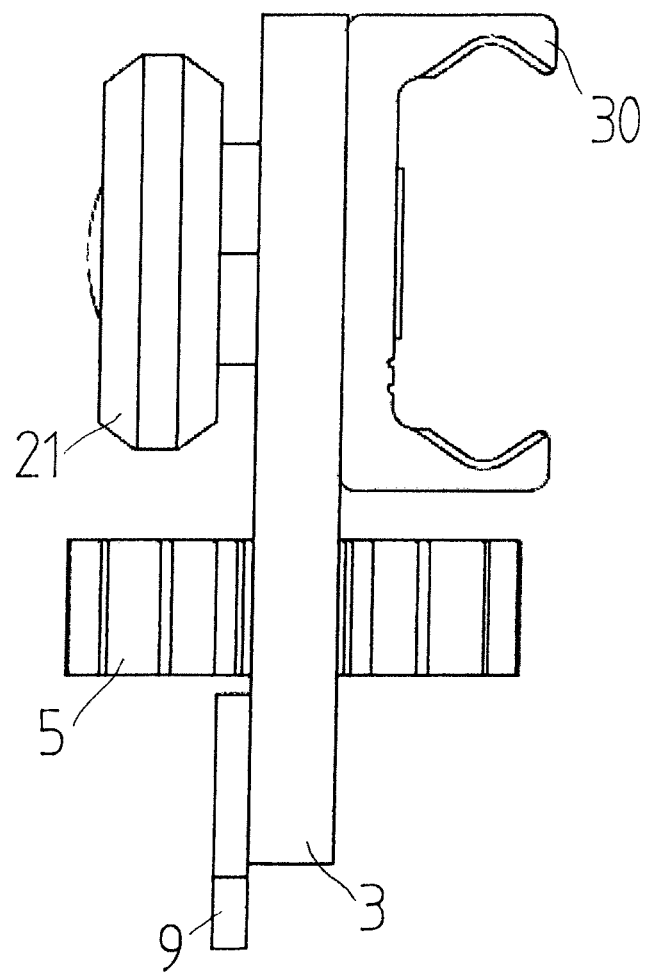
FIG. 10 is an end view of a component of the telescopic finger element according to FIG. 9.

FIG. 10 shows an end view of the middle finger element 3 with the gear wheel 5, and with the guide profile 30 on one side and the guide rollers 21 mounted on the opposite side. Attached to the underside of the middle finger element 3 is a rack element 9, which extends in longitudinal direction and, in the installed state, is coupled with the linear drive element 50, via which the middle guiding element 3 can be moved relative to the carrier element 2 in two opposite directions Like the guide profile 31, the guide profile 30 exhibits a C-shaped cross section, whereby the associated guide rollers 20, 21 (FIG. 9) are configured as truncated cone rollers that abut corresponding inner surfaces of the guide profiles 30, 31 with their truncated cone surfaces.

Figure 11:
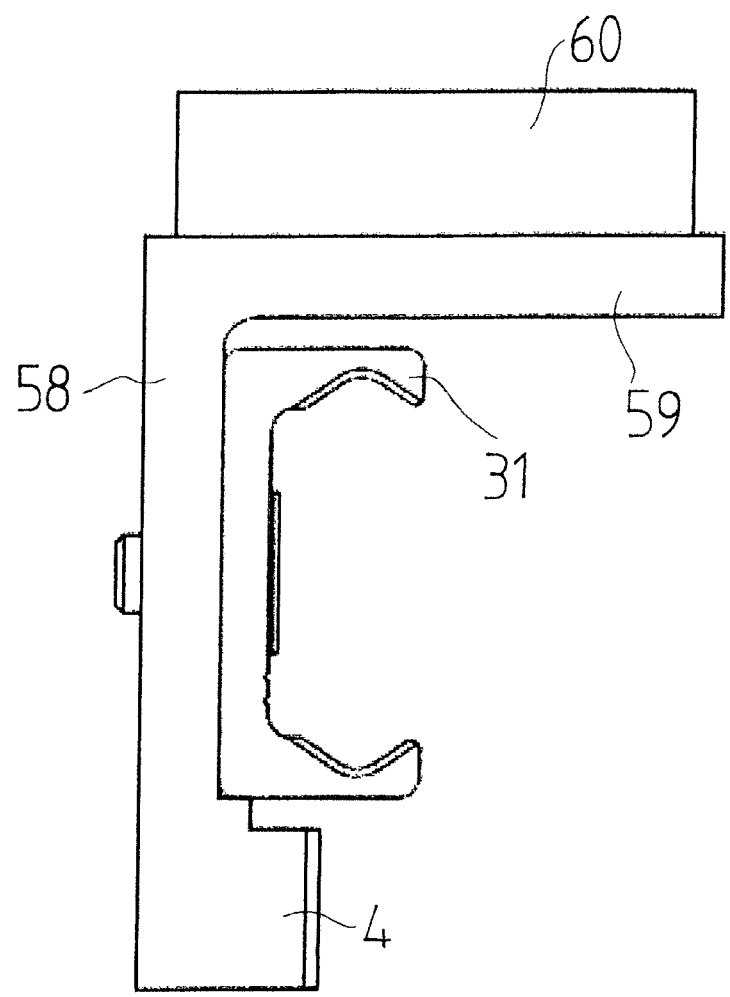
FIG. 11 is an end view of another component of the telescopic finger element according FIG. 9.

As shown in FIG. 9 and partially in FIG. 11, the carrier element 2, the middle finger element 3 and the end finger element 4 are disposed next to one another, whereby the end finger element 4 exhibits a profile with a vertically extending leg 58 and an overhead crosspiece 59, on which a support element 60 is disposed for moving loads and which—seen in cross section—extends in the direction of the carrier element 2 at a distance above the upper edge of the middle finger element 3.

The middle finger element 3 is disposed in the middle between the carrier element 2 and the end finger element 4.

FIG. 9 further shows that the conveying device 15 associated with the telescopic accommodating finger 1 is disposed on the side of the carrier element 2 facing away from the middle finger the element 3.

The conveying device 15 in the depicted design example is formed by two frontally adjoining conveyor belt units 16, 17 (FIG. 4A, 4B), which, on their upper side, form a linear conveyor path that lies above the upper edge of the support element 60. The conveyor belt units 16, 17 exhibit rollers 150 (FIG. 7, 8) that are mounted on the carrier element 2 and over which an endless belt is guided that, at one location, is coupled to a drive unit 105 (FIG. 2, 3).

Figure 12:
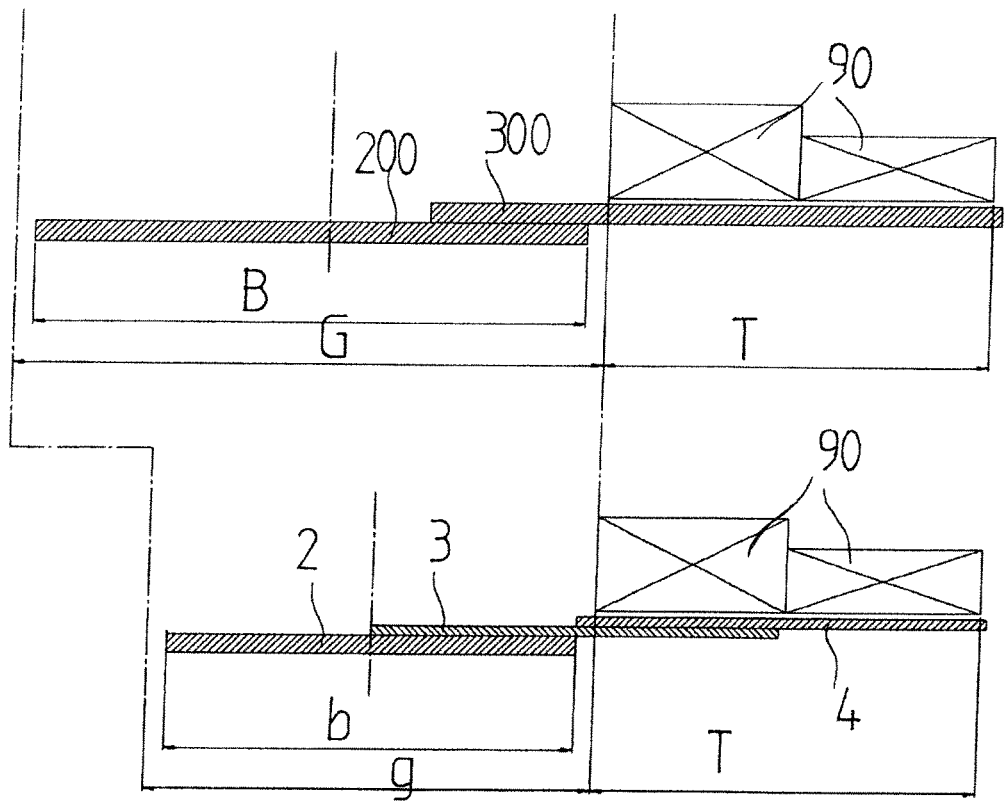
FIG. 12 is a schematic comparison of a known and an inventive telescopic accommodating finger.

The comparative representation according to FIG. 12 illustrates one advantage of the invention over the conventional extendable arrangement shown above, which, for the sake of stability, requires the two arms 200, 300 to overlap to a relatively large degree, thus necessitating a large width B of the storage and retrieval machine for the same shelf depth T, and consequently a large aisle clearance G. In contrast, the required length of the end finger element 4 for holding the load 90 in the inventive arrangement shown below is approximately equal to the required width b of the storage and retrieval machine, allowing the achievement of a very narrow design, and with it a considerably smaller aisle clearance g.

In practice, the compact design is an advantage. A minimum distance of 75 mm from finger middle to finger middle can be achieved, allowing the inventive storage and retrieval machine to be used even for very small containers such as packages, boxes, . . . etc., with footprint dimensions of only 100×100 mm for example, whereby at least two fingers have to be in use at a time, so that the container does not tip over.

Despite the design of the guide profiles 30, 31 as a type of open C-profile, this compact design of the inventive telescopic accommodating finger 1 nonetheless ensures adequate stability, because the individual telescopic elements, the guide profile 30 with the middle finger element 3, the guide profile 31 with the end finger element 4 as well as the carrier element 2 with the load handling device 95, are all rigidly connected, thereby achieving the required moment of resistance.

Figure 13:
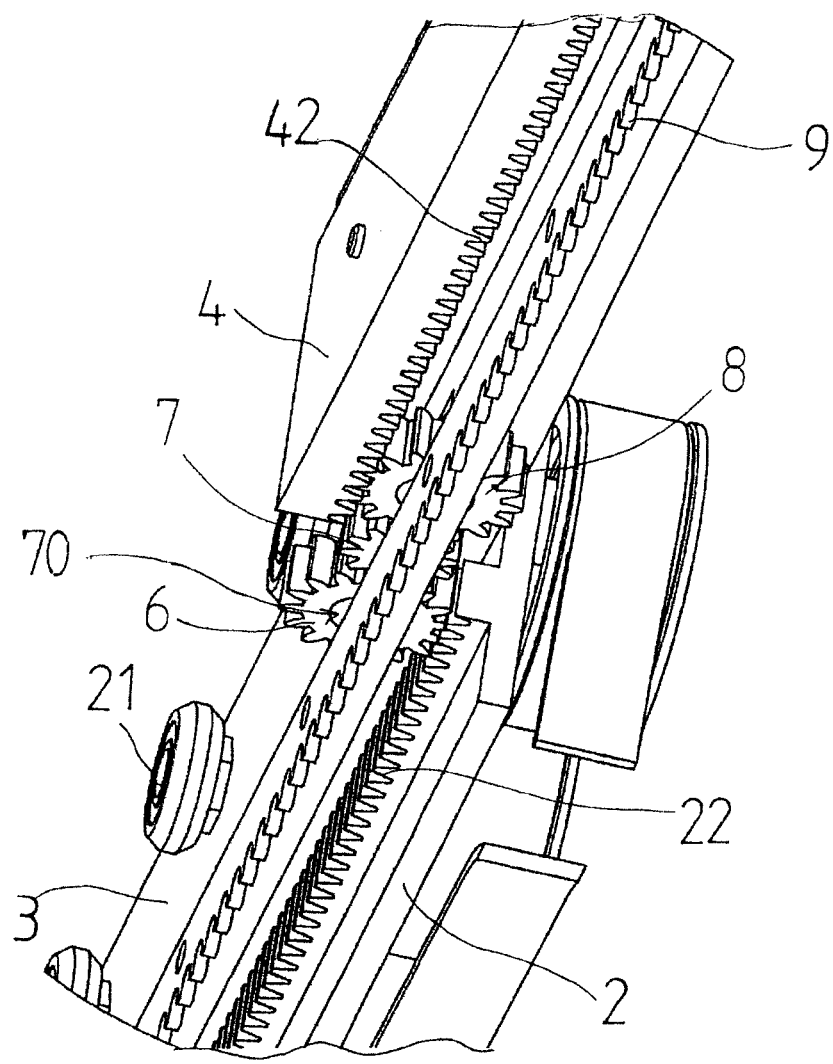
FIG. 13 is a detail of an oblique view from below of another embodiment of the inventive storage and retrieval machine and FIG. 14 is a partial section through the embodiment according to FIG. 13.

FIGS. 13 and 14 show a further embodiment of the inventive storage and retrieval machine, in which the coupling element 5 is formed by three paired gear wheels 6, 7, 8, whereby the middle finger element 3 disposed between the carrier element 2 and the end finger element 4 exhibits an opening 70 in which the gear wheels 6, 7, 8, of which the outer gear wheels 6, 8 meshably engage in the rack section 22 of the carrier element 2 and in the rack section 42 of the end finger element 4, are rotatably mounted. The movement of the gear wheel 8 is thereby coupled with the movement of the gear wheel 6 via the smaller gear wheel 7 in the middle, which is not engaged in the rack sections 22, 42, so that, upon a linear movement of the middle finger element 3 relative to the carrier element 2 caused by the linear drive element 50, the end finger element 4 executes a linear movement by rolling the outer gear wheels 6, 8 in the direction of the linear movement of the middle finger element 3. This requires the linear drive element 50 in this design to be formed by three paired gear wheels 51, 52, 53 as well, however, whereby the smaller gear wheel 52 in the middle, that is not engaged in the rack element 9, represents the driving gear wheel for the two outer gear wheels 51, 53, which, depending on the travel position of at least one of the two gear wheels 51, 53, are meshably engaged in the rack element 9.

It is also possible to combine more than three gear wheels at a time for this arrangement, as long as a synchronous movement of the rack sections 22 and 42 or the rack element 9 is achieved and the required stability of the telescopic accommodating fingers 1 is still given.

Due to the interposed smaller gear 7, the ends of the carrier element 2 and the end finger element 4 are spaced from one another in the extended position, which allows a greater extendable length in comparison to the previous embodiment, without a noticeable reduction in the stability. This minor extendability can ensure that even a very small load 90 in the rearmost position in the shelf, as shown in FIG. 6 with dashed lines, can be handled without difficulty.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LISTING OF REFERENCE NUMERALS

1. Telescopic accommodating finger
2. Carrier element
3. Middle finger element
4. End finger element
5. Gear wheel
6. Gear wheel
7. Gear wheel
8. Gear wheel
9. Rack element
15. Conveying device
16. Conveyor belt unit
17. Conveyor belt unit
20. Guide roller
21. Guide roller
22. Rack section
23.
30. Guide profile
31. Guide profile
32.
41.
42. Rack section
43.
50. Linear drive element
51. Gear wheel
52. Gear wheel
53. Gear wheel
54.
55. Axis of rotation
56.
57.
58. Leg
59. Crosspiece
60. Support element
70. Opening
71.
72.
85. Lifting carriage
86. U-profile
90. Load
91. Rack
92. Rack
93. Rail
94. Mast
95. Load handling device
96. Aisle
97. Shelf
105. Drive unit
106.
200. Arm
300. Arm

What is claimed is:

1. A storage and retrieval machine for storage and retrieval of a load onto a rack, or out of the rack, the storage and retrieval machine comprising:
    a horizontal drive;
    a vertical drive;
    a lifting carriage movable by actuation of the horizontal drive and the vertical drive, the lifting carriage comprising a load-accommodating unit with a plurality of individually controllable telescopic accommodating fingers disposed next to one another, and conveying devices are allocated to the telescopic accommodating fingers;
    each telescopic accommodating finger comprising:
        a carrier element that is fixed relative to the lifting carriage,
        a middle finger element, and
        an end finger element,
        wherein the middle finger element and the end finger element are retractable and extendable parallel to and in both longitudinal axis directions relative to the carrier element;
    a linear drive element coupled with the middle finger element and actuating movement of the middle finger element in a direction of a longitudinal axis of the middle finger element; and
    at least one coupling element on the middle finger element and in engagement with the end finger element, the coupling element converting movement of the middle finger element into an additional movement of the end finger element in the same direction.

2. The storage and retrieval machine of claim 1, wherein each telescopic accommodating finger further comprises:
    rack sections disposed on the carrier element and the end finger element, respectively, the rack sections extending in a longitudinal direction and arranged across from one another; and
    at least one coupling element formed by a gear wheel;
    the middle finger element disposed between the carrier element and the end finger element, and including an opening in which the gear wheel is rotatably mounted;
    the gear wheel meshably engaging the rack section of the carrier element and the rack section of the end finger element such that, upon a linear movement of the middle finger element relative to the carrier element caused by the linear drive element, the end finger element executes a linear movement by rolling the gear wheel in the direction of the linear movement of the middle finger element.

3. The storage and retrieval machine of claim 2, wherein the end finger element has a travel path that is twice as long as a travel path of the middle finger element.

4. The storage and retrieval machine of claim 2, wherein an axis of rotation of the gear wheel is perpendicular to the longitudinal axis and lies in the plane of the middle finger element.

5. The storage and retrieval machine of claim 2, wherein the gear wheel is disposed at approximately half the length of the middle finger element.

6. The storage and retrieval machine of claim 1, wherein each telescopic accommodating finger further comprises:
- rack sections disposed on the carrier element and the end finger element, respectively, the rack sections extending in a longitudinal direction and arranged across from one another; and
- at least one coupling element formed by a at least three paired gear wheels;
- the middle finger element disposed between the carrier element and the end finger element, and including an opening in which the gear wheel is rotatably mounted;
- at least two of the gear wheels meshably engaging the rack section of the carrier element and the rack section of the end finger element such that, upon a linear movement of the middle finger element relative to the carrier element caused by the linear drive element, the end finger element executes a linear movement by rolling the gear wheels in the direction of the linear movement of the middle finger element.

7. The storage and retrieval machine of claim 6, wherein the linear drive element is also formed by three paired gear wheels, wherein a smaller one of the gear wheels is disposed between the other two gear wheels and does not engage the rack element, the smaller gear wheel acting as a drive gear wheel for the two outer gear wheels that, depending on the travel position of at least one of the outer gear wheels, meshably engage the rack element.

8. The storage and retrieval machine of claim 1, wherein each telescopic accommodating finger further comprises:
- longitudinally spaced guide rollers disposed on one side of the carrier element and the middle finger element;
- a guide profile engaging each guide roller;
- each guide roller being movable relative to the carrier element and the middle finger element, and mounted on the side of the middle finger element opposite the carrier element, or mounted on the side of the end finger element opposite the middle finger element.

9. The storage and retrieval machine of claim 8, wherein:
the guide profiles comprise C-shaped cross sections; and
the guide rollers are configured as truncated cone rollers that abut corresponding inner surfaces of the guide profiles with respective truncated cone surfaces.

10. The storage and retrieval machine of claim 1, wherein each end finger element comprises:
- a profile defined by a vertically extending leg and an overhead crosspiece; and
- a support element for moving loads disposed on the crosspiece and which, viewed in cross-section, extends in a direction toward the carrier element at a distance above an upper edge of the middle finger element.

11. The storage and retrieval machine of claim 1, wherein each middle finger element comprises a rack element on a bottom surface thereof, the rack element extending in longitudinal direction and coupled with the linear drive element, whereby the middle finger element is movable relative to the carrier element in two opposing directions.

12. The storage and retrieval machine of claim 1, wherein the conveying device allocated to each telescopic accommodating finger is disposed on a side of the carrier element facing away from the middle finger element.

13. The storage and retrieval machine of claim 1, wherein the conveying device is formed by two frontally adjoining conveyor belt units, and wherein upper sides of the conveyor belts form a linear conveyor path that lies above the upper edge of a support element disposed on each end finger element.

14. The storage and retrieval machine of claim 1, wherein the middle finger element is disposed in the between the carrier element and the end finger element.

* * * * *

UNITED STATES PATENT AND TRADEMARK OFFICE
CERTIFICATE OF CORRECTION

PATENT NO. : 10,589,928 B2
APPLICATION NO. : 15/302855
DATED : March 17, 2020
INVENTOR(S) : Aschauer Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this
First Day of September, 2020

Andrei Iancu
*Director of the United States Patent and Trademark Office*